(12) United States Patent
Park et al.

(10) Patent No.: US 9,133,323 B2
(45) Date of Patent: Sep. 15, 2015

(54) FLAME RETARDANT THERMOPLASTIC RESIN COMPOSITION

(71) Applicant: Cheil Industries Inc., Gumi-si (KR)

(72) Inventors: Hwan Seok Park, Uiwang-si (KR); Seung Shik Shin, Uiwang-si (KR); Kyuong Sik Chin, Uiwang-si (KR); Yun Ku Nam, Uiwang-si (KR); Jong Tae Yoon, Uiwang-si (KR)

(73) Assignee: Cheil Industries Inc., Gum-si (KR)

( * ) Notice: Subject to any disclaimer, the term of this patent is extended or adjusted under 35 U.S.C. 154(b) by 87 days.

(21) Appl. No.: 13/924,878

(22) Filed: Jun. 24, 2013

(65) Prior Publication Data

US 2013/0281568 A1    Oct. 24, 2013

Related U.S. Application Data

(63) Continuation-in-part of application No. PCT/KR2011/009305, filed on Dec. 2, 2011.

(30) Foreign Application Priority Data

Dec. 28, 2010    (KR) ........................ 10-2010-0137073

(51) Int. Cl.
*C08K 5/52*    (2006.01)
*C08L 69/00*    (2006.01)
*C08J 3/20*    (2006.01)
*C08K 5/523*    (2006.01)

(52) U.S. Cl.
CPC ... *C08K 5/52* (2013.01); *C08J 3/20* (2013.01); *C08L 69/00* (2013.01); *C08J 2369/00* (2013.01); *C08K 5/523* (2013.01); *C08L 2201/02* (2013.01); *C08L 2205/025* (2013.01)

(58) Field of Classification Search
CPC .......... C08K 5/52; C08K 5/523; C08L 69/00; C08L 2201/02; C08L 2205/025; C08J 3/20; C08J 2369/00
USPC .......................................... 523/122; 524/127
See application file for complete search history.

(56) References Cited

U.S. PATENT DOCUMENTS

| 5,741,838 | A | 4/1998 | Fuhr et al. |
| 6,197,857 | B1 * | 3/2001 | Nodera et al. ................ 524/141 |
| 6,753,366 | B1 | 6/2004 | Eckel et al. |
| 8,299,150 | B2 | 10/2012 | Nagatoshi et al. |
| 2009/0203831 | A1 | 8/2009 | Ma et al. |
| 2011/0306712 | A1 | 12/2011 | Inagaki |
| 2012/0172504 | A1 | 7/2012 | Chin et al. |

FOREIGN PATENT DOCUMENTS

| CN | 101519528 A | 9/2009 |
| DE | 112005003185 T5 | 2/2008 |
| JP | 08-067810 A | 3/1996 |
| JP | 09-151297 A | 6/1997 |
| JP | 2001-234051 A | 8/2001 |
| JP | 2004-352762 A | 12/2004 |
| JP | 2006-316152 A | 11/2006 |
| JP | 2007-045908 A | 2/2007 |
| JP | 2009-203270 A | 9/2009 |
| KR | 10-2004-0062428 A | 7/2004 |
| WO | 2010/100865 A1 | 9/2010 |
| WO | 2012/091307 A2 | 7/2012 |

OTHER PUBLICATIONS

International Search Report in counterpart International Application No. PCT/KR2011/009305 dated Jun. 26, 2012, pp. 1-4.
Office Action in commonly owned U.S. Appl. No. 13/339/781 mailed Apr. 24, 2014, pp. 1-15.
Office Action in commonly owned Korean Application No. 10-2011-0088704 dated Dec. 20, 2013, pp. 1-6.
German Office Action in commonly owned German Application No. 102011090134.5 dated Dec. 21, 2012, pp. 1-5.
English translation of German Office Action in commonly owned German Application No. 102011090134.5 dated Dec. 21, 2012, pp. 1-2.
Office Action in commonly owned U.S. Appl. No. 13/339,791 mailed Jul. 24, 2013, pp. 1-15.
Office Action in counterpart Chinese Application No. 201110412389.7 dated Sep. 22, 2013, pp. 1-6.
English translation of Office Action in counterpart Chinese Application No. 201110412389.7 dated Sep. 22, 2013, pp. 1-2.

* cited by examiner

*Primary Examiner* — Kriellion Sanders
(74) *Attorney, Agent, or Firm* — Additon, Higgins & Pendleton, P.A.

(57) ABSTRACT

A flame retardant thermoplastic resin composition includes (a) a polycarbonate resin, (b) an impact modifier, and (c) resorcinol bis(diphenyl phosphate). The impact modifier includes (b1) a large rubber particle-modified vinyl graft copolymer wherein the rubber particle has an average particle diameter of about 0.3 to about 0.7 μm, and (b2) a small rubber particle-modified graft copolymer wherein the rubber particle has an average particle diameter of about 0.05 to about 0.27 μm. The flame retardant thermoplastic resin composition can have excellent flowability, mold formability, flame retardancy, impact strength, and gloss characteristics.

10 Claims, No Drawings

FLAME RETARDANT THERMOPLASTIC RESIN COMPOSITION

CROSS-REFERENCE TO RELATED APPLICATIONS

This application is a continuation-in-part of International Application No. PCT/KR2011/009305, filed Dec. 2, 2011, pending, which designates the U.S., published as WO 2012/091307A2, and is incorporated herein by reference in its entirety, and claims priority therefrom under 35 USC Section 120. This application also claims priority under 35 USC Section 119 to and the benefit of Korean Patent Application No. 10-2010-0137073, filed Dec. 28, 2010, the entire disclosure of which is incorporated herein by reference.

FIELD OF THE INVENTION

The present invention relates to a flame retardant thermoplastic resin composition.

BACKGROUND OF THE INVENTION

Excellent processing properties and mechanical properties of polycarbonate/acrylonitrile-butadiene-styrene (PC/ABS) alloy resins are attributed to high heat resistance and impact strength of the polycarbonate resins and good processability and chemical resistance of the ABS copolymer resins. PC/ABS alloy resins exhibit better physical properties than ABS and can be produced at lower costs than PC.

Due to these advantages, PC/ABS alloy resins can be utilized in various applications. For example, PC/ABS alloy resins are widely used in not only electrical/electronic products, such as monitor housings, hard disks, printers and notebook batteries, but also in automobile parts, such as door handles, bumpers and instrument panels. Thus, high flame retardancy is required to make PC/ABS alloy resins suitable for use in molded articles, such as housings of electronic products.

A general method for imparting flame retardancy to a thermoplastic resin includes mixing the thermoplastic resin with a brominated or chlorinated compound as a halogenated flame retardant. Halogenated flame retardants exert sufficient flame retardancy in the case of fire but can cause mold corrosion and environmental pollution problems during processing. Particularly, halogenated dioxin generated from halogenated flame retardants upon fire or incineration is fatal to humans and is a major cause of environmental pollution. For these reasons, the use of halogenated flame retardants is legally restricted under the control of the Swedish Confederation of Professional Employees (TCO) in Europe.

Under such circumstances, technologies associated with the use of phosphorus-based flame retardants instead of halogenated flame retardants have been developed recently. Triphenyl phosphate (TPP) and bisphenol A bis(diphenyl phosphate) (BDP) are mainly used as phosphorus-based flame retardants. TPP can be added at a level of 10% by weight per the total weight of a resin to achieve a flame retardancy rating level of V-0. However, TPP undergoes bridging or evaporation during extrusion due to the low melting point thereof. BDP may cause a problem in the flowability of resins due to the high viscosity and high molecular weight thereof.

SUMMARY OF THE INVENTION

The present invention provides a flame retardant thermoplastic resin composition that can have excellent impact strength, flowability and gloss characteristics.

The present invention also provides a molded article produced by extrusion or injection molding of the flame retardant thermoplastic resin composition.

The flame retardant thermoplastic resin composition includes (a) a polycarbonate resin, (b) an impact modifier, and (c) resorcinol bis(diphenyl phosphate) wherein the impact modifier includes (b1) a large rubber particle-modified vinyl graft copolymer wherein the rubber particle has an average particle diameter of about 0.3 to about 0.7 µm, and (b2) a small rubber particle-modified graft copolymer wherein the rubber particle has an average particle diameter of about 0.05 to about 0.27 µm.

The composition may include about 100 parts by weight of a base resin including about 80 to about 99% by weight of the polycarbonate resin (a) and about 1 to about 20% by weight of the impact modifier (b), and about 7 to about 30 parts by weight of resorcinol bis(diphenyl phosphate) with respect to about 100 parts by weight of the base resin.

The large rubber particle-modified vinyl graft copolymer (b1) and the small rubber particle-modified graft copolymer (b2) may be present in a weight ratio of about 1:1.3 to about 1:3.

In one embodiment, the small rubber particle-modified graft copolymer (b2) may include units derived from a $C_1$-$C_8$ alkyl (meth)acrylate.

The thermoplastic resin composition can have a gloss of 98 to 105 (ASTM D523, 60°), a melt flow index (ISO 1133, 220° C., 10 kg) of about 100 to about 130 g/10 min, and a flame retardancy rating (UL94, 2 mm) of V-0.

The present invention also provides a molded article produced by molding the flame retardant thermoplastic resin composition.

The thermoplastic resin composition of the present invention can have excellent flowability and a low softening point. These advantages can enable processing of the thermoplastic resin composition at a lower temperature, contributing to enhancement of mold formability. In addition, the thermoplastic resin composition of the present invention can exhibit excellent flame retardancy, impact strength and gloss characteristics. Therefore, the thermoplastic resin composition of the present invention can be used to produce various electrical/electronic products and automobile parts where high flame retardancy, impact strength, flowability and gloss characteristics are simultaneously required.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a flame retardant thermoplastic resin composition including (a) a polycarbonate resin, (b) an impact modifier, and (c) resorcinol bis(diphenyl phosphate).

The constitution of the present invention will now be described in more detail.

(a) Polycarbonate Resin

The polycarbonate resin (a) may be prepared by reacting one or more diphenols represented by Formula I below with phosgene, a halogen acid ester, a carbonic acid ester, or a combination thereof:

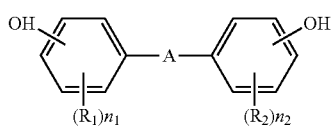

[Formula 1]

wherein A is a single bond, substituted or unsubstituted straight or branched $C_1$-$C_{30}$ alkylene, substituted or unsubstituted $C_2$-$C_5$ alkenylene, substituted or unsubstituted $C_2$-$C_5$ alkylidene, substituted or unsubstituted straight or branched $C_1$-$C_{30}$ haloalkylene, substituted or unsubstituted $C_5$-$C_6$ cycloalkylene, substituted or unsubstituted $C_5$-$C_6$ cycloalkenylene, substituted or unsubstituted $C_5$-$C_{10}$ cycloalkylidene, substituted or unsubstituted $C_6$-$C_{30}$ arylene, substituted or unsubstituted straight or branched $C_1$-$C_{20}$ alkoxylene, a halogen acid ester group, a carbonic acid ester group, CO, S or $SO_2$, $R_1$ and $R_2$ are identical to or different from each other and are each independently substituted or unsubstituted $C_1$-$C_{30}$ alkyl or substituted or unsubstituted $C_6$-$C_{30}$ aryl, and $n_1$ and $n_2$ are the same or different and are each independently an integer from 0 to 4.

A combination of two or more diphenols that can be represented by Formula I may also constitute repeating units of the polycarbonate resin. Specific examples of such diphenols include, but are not necessarily limited to, 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof. In exemplary embodiments, 2,2-bis(4-hydroxyphenyl)propane, 2,2-bis(3,5-dichloro-4-hydroxyphenyl)propane, and/or 1,1-bis(4-hydroxyphenyl)cyclohexane, for example, 2,2-bis(4-hydroxyphenyl)propane (also called bisphenol-A), can be used.

Resorcinol and/or hydroquinone may also be used as the diphenol compound.

The polycarbonate resin (a) may have a weight average molecular weight of about 10,000 to about 200,000 g/mol, for example about 15,000 to about 100,000 g/mol, and as another example about 20,000 to about 80,000 g/mol.

The polycarbonate resin (a) may be a homopolymer of a dihydric phenolic compound, a copolymer of two or more different dihydric phenolic compounds, or a mixture thereof.

The polycarbonate resin (a) may be a linear polycarbonate resin, a branched polycarbonate resin, a copolymer thereof, or a mixture thereof. The polycarbonate resin (a) may take another form, for example, a polyester carbonate copolymer resin.

In one embodiment, the polycarbonate resin (a) may have a flow index of about 5 to about 180 g/10 min, for example about 7 to about 100 g/10 min, as measured at 300° C. and 1.2 kg in accordance with ISO 1133. In exemplary embodiments, the polycarbonate resin (a) is a combination of two or more polycarbonates having different flow indices. For example, the polycarbonate resin (a) may be a mixture of about 60 to about 95% of a polycarbonate resin having a flow index of about 41 to about 100 g/10 min and about 5 to about 40% by weight of a polycarbonate resin having a flow index of about 5 to about 40 g/10 min, wherein the amounts are based on the total weight of the combination of two or more polycarbonates having different flow indices. In this case, a good balance of physical properties can be obtained.

In some embodiments, the mixture of polycarbonates having different flow indices may include a polycarbonate resin having a flow index of about 41 to about 100 g/10 min in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of a polycarbonate resin having a flow index of about 41 to about 100 g/10 min can be in a range from about any of the foregoing amounts to about any other of the foregoing amounts.

In some embodiments, the mixture of polycarbonates having different flow indices may include a polycarbonate resin having a flow index of about 5 to about 40 g/10 min in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of a polycarbonate resin having a flow index of about 5 to about 40 g/10 min can be in a range from about any of the foregoing amounts to about any other of the foregoing amounts.

The base resin may include the polycarbonate resin (a) in an amount of about 80 to about 99% by weight, for example about 85 to about 95% by weight, based on the total weight of the base resin including the polycarbonate resin (a) and the impact modifier (b). In some embodiments, the base resin may include the polycarbonate resin (a) in an amount of about 80, 81, 82, 83, 84, 85, 86, 87, 88, 89, 90, 91, 92, 93, 94, 95, 96, 97, 98, or 99% by weight. Further, according to some embodiments of the present invention, the amount of the polycarbonate resin (a) can be in a range from about any of the foregoing amounts to about any other of the foregoing amounts.

When the base resin includes the polycarbonate resin (a) in an amount within this range, impact strength, flowability, heat resistance and colorability can be balanced.

(b) Impact Modifier (b1) Large Rubber Particle-Modified Vinyl Graft Copolymer

The large rubber particle-modified vinyl graft copolymer may have a core-shell structure in which a rubbery polymer forms a core and an unsaturated monomer is grafted onto the core to form a shell.

In one embodiment, the large rubber particle-modified vinyl graft copolymer (b1) may be prepared by graft polymerization of a rubbery polymer and a monomer mixture including an aromatic vinyl compound and a cyanide vinyl compound. The rubbery polymer, the aromatic vinyl compound, and the cyanide vinyl compound can be used in amounts of about 40 to about 60% by weight, about 30 to about 40% by weight, and about 10 to about 20% by weight, respectively, each based on the total weight of the large rubber particle-modified vinyl graft copolymer (b1). Within these ranges, appropriate impact strength and flowability can be ensured.

In some embodiments, the large rubber particle-modified vinyl graft copolymer (b1) may include a rubbery polymer in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of a rubbery polymer can be in a range from about any of the foregoing amounts to about any other of the foregoing amounts.

In some embodiments, the large rubber particle-modified vinyl graft copolymer (b1) may include an aromatic vinyl compound in an amount of about 30, 31, 32, 33, 34, 35, 36, 37, 38, 39, or 40% by weight. Further, according to some embodiments of the present invention, the amount of an aromatic vinyl compound can be in a range from about any of the foregoing amounts to about any other of the foregoing amounts.

In some embodiments, the large rubber particle-modified vinyl graft copolymer (b1) may include a cyanide vinyl compound in an amount of about 10, 11, 12, 13, 14, 15, 16, 17, 18, 19, or 20% by weight. Further, according to some embodiments of the present invention, the amount of a cyanide vinyl compound can be in a range from about any of the foregoing amounts to about any other of the foregoing amounts.

Examples of the rubbery polymer may include without limitation polybutadiene rubbers, acrylic rubbers, ethylene/propylene rubbers, styrene/butadiene rubbers, acrylonitrile/butadiene rubbers, isoprene rubbers, acrylic-based rubbers, ethylene-propylene-diene terpolymers (EPDM), polyorganosiloxane/polyalkyl (meth)acrylate rubber composites, and the like, and mixtures thereof. In exemplary embodiments, a polybutadiene rubber can be used as the rubbery polymer.

The average particle diameter of the rubbery polymer used in the present invention may be from about 0.3 to about 0.7 μm, for example from about 0.3 to about 0.5 μm. In some embodiments, the average particle diameter of the rubbery polymer may range from about 0.3, 0.4, 0.5, 0.6, or 0.7 μm. Further, according to some embodiments of the present invention, the average particle diameter of the rubbery polymer can be in a range from about any of the foregoing amounts to about any other of the foregoing amounts. Within this range, impact strength can be effectively exhibited.

The average particle diameter is measured by using a particle size analyzer (Mastersizer S Ver. 2.14, Malvern).

Examples of the aromatic vinyl compound may include without limitation styrene, α-methylstyrene, halogenated styrenes, C1-C10 alkylated styrenes and the like, and combinations thereof. In exemplary embodiments, styrene can be used.

Examples of the cyanide vinyl compound may include without limitation acrylonitrile, methacrylonitrile and the like, and combinations thereof. In exemplary embodiments, acrylonitrile can be used.

At least one unsaturated monomer may be further added to the monomer mixture before graft polymerization. Examples of the unsaturated monomer may include without limitation $C_1$-$C_8$ alkyl methacrylates, $C_1$-$C_8$ alkyl acrylates, maleic anhydride, and the like, and combinations thereof. The $C_1$-$C_8$ alkyl methacrylate and the $C_1$-$C_8$ alkyl acrylate are an alkyl methacrylic acid ester and an alkyl acrylic acid ester obtained from a monohydric alcohol including 1 to 8 carbon atoms, respectively. Specific examples of such alkyl methacrylates and alkyl acrylates include without limitation methyl methacrylate, ethyl methacrylate, propyl methacrylate, ethyl acrylate, methyl acrylate, and the like, and combinations thereof.

The unsaturated monomer may be included in an amount of about 20% by weight or less. In some embodiments, the large rubber particle-modified vinyl graft copolymer (b1) may include unsaturated monomer in an amount of 0 (the unsaturated monomer is not present), about 0 (the unsaturated monomer is present), 1, 2, 3, 4, 5, 6, 7, 8, 9, 10, 11, 12, 13, 14, 15, 16, 17, 18, 19, or 20% by weight. Further, according to some embodiments of the present invention, the amount of unsaturated monomer can be in a range from about any of the foregoing amounts to about any other of the foregoing amounts.

Advantageously, the large rubber particle-modified vinyl graft copolymer may be prepared by graft copolymerization of a monomer mixture of styrene, acrylonitrile and optionally an alkyl (meth)acrylate onto a polybutadiene rubber, an acrylic rubber or a styrene/butadiene rubber. In exemplary embodiments, acrylonitrile-butadiene-styrene (ABS) graft copolymer can be used as the large rubber particle-modified vinyl graft copolymer.

The weight average molecular weight of the large rubber particle-modified vinyl graft copolymer may be from about 50,000 to about 200,000 g/mol. Within this range, good compatibility with a matrix and high impact strength can be exhibited.

(b2) Rubber-Modified Graft Copolymer Having Smaller Particle Diameter

The small rubber particle-modified graft copolymer (b2) may be prepared by graft polymerization of a rubbery polymer, an aromatic vinyl compound, and a monomer copolymerizable with the aromatic vinyl compound. The rubbery polymer, the aromatic vinyl compound, and the monomer copolymerizable with the aromatic vinyl compound can be used in amounts of about 40 to about 60% by weight, about 30 to about 40% by weight, and about 10 to about 20% by weight, respectively, each based on the total weight of the small rubber particle-modified vinyl graft copolymer (b1). Within these ranges, appropriate impact strength and flowability can be ensured.

In some embodiments, the small rubber particle-modified vinyl graft copolymer (b2) may include a rubbery polymer in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of a rubbery polymer can be in a range from about any of the foregoing amounts to about any other of the foregoing amounts.

In some embodiments, the small rubber particle-modified vinyl graft copolymer (b2) may include an aromatic vinyl compound in an amount of about 30, 31, 32, 33, 34, 35, 36, 37, 38, 39, or 40% by weight. Further, according to some embodiments of the present invention, the amount of an aromatic vinyl compound can be in a range from about any of the foregoing amounts to about any other of the foregoing amounts.

In some embodiments, the small rubber particle-modified vinyl graft copolymer (b2) may include a monomer copolymerizable with the aromatic vinyl compound in an amount of about 10, 11, 12, 13, 14, 15, 16, 17, 18, 19, or 20% by weight. Further, according to some embodiments of the present invention, the amount of a monomer copolymerizable with the aromatic vinyl compound can be in a range from about any of the foregoing amounts to about any other of the foregoing amounts.

Examples of the rubbery polymer may include without limitation polybutadiene rubbers, acrylic rubbers, ethylene/propylene rubbers, styrene/butadiene rubbers, acrylonitrile/butadiene rubbers, isoprene rubbers, acrylic-based rubbers, ethylene-propylene-diene terpolymers (EPDM), polyorganosiloxane/polyalkyl (meth)acrylate rubber composites, and the like, and mixtures thereof. In exemplary embodiments, a polybutadiene rubber can be used as the rubbery polymer.

The average particle diameter of the small rubber particle-modified graft copolymer used in the present invention is from about 0.05 to about 0.27 μm, for example from about 0.1 to about 0.25 μm. In some embodiments, the average particle diameter of the rubbery polymer may range from about 0.05, 0.06, 0.07, 0.08, 0.09, 0.1, 0.2, 0.21, 0.22, 0.23, 0.24, 0.25, 0.26, or 0.27 μm. Further, according to some embodiments of the present invention, the average particle diameter of the rubbery polymer can be in a range from about any of the foregoing amounts to about any other of the foregoing amounts.

When the average particle diameter is within the range defined above, the appearance of an injection-molded article can be kept at a high gloss level and the color of the molded article can be exhibited well, making it possible to maintain good appearance of the molded article.

Examples of the aromatic vinyl compound may include without limitation styrene, α-methylstyrene, halogenated styrenes, C1-C10 alkylated styrenes, and the like, and combinations thereof. In exemplary embodiments, styrene can be used.

Examples of the monomer copolymerizable with the aromatic vinyl compound may include without limitation acrylonitrile, methacrylonitrile, $C_1$-$C_8$ alkyl (meth)acrylates, N-substituted maleimides, maleic anhydride, and the like, and mixtures thereof. In exemplary embodiments, acrylonitrile and/or a $C_1$-$C_8$ alkyl (meth)acrylate can be used, for example, a $C_1$-$C_8$ alkyl (meth)acrylate can be used.

An acrylonitrile butadiene styrene (ABS) graft copolymer or a methyl methacrylate-butadiene-styrene (MBS) copolymer can be used as the rubber-modified vinyl graft copolymer having a smaller particle diameter.

The weight average molecular weight of the rubber-modified vinyl graft copolymer having a smaller particle diameter may be from 80,000 to 500,000 g/mol. Within this range, good compatibility with a matrix and high impact strength can be exhibited.

The weight ratio of the large rubber particle-modified vinyl graft copolymer (b1) to the small rubber particle-modified graft copolymer (b2) may be from about 1:1.3 to about 1:3, for example about 1:1.5 to about 1:2. Within this range, appropriate gloss characteristics, flowability and impact strength of the resin can be ensured.

The base resin may include the impact modifier (b) in an amount of about 1 to about 20% by weight, for example about 5 to about 15% by weight, based on the total weight of the base resin including the polycarbonate resin (a) and the impact modifier (b). In some embodiments, the composition may include the impact modifier (b) in an amount of about 1, 2, 3, 4, 5, 6, 7, 8, 9, 10, 11, 12, 13, 14, 15, 16, 17, 18, 19, or 20% by weight. Further, according to some embodiments of the present invention, the amount of impact modifier (b) can be in a range from about any of the foregoing amounts to about any other of the foregoing amounts.

Within this range, improvement of gloss and flowability is possible without causing deterioration in impact strength.

(c) Resorcinol Bis(Diphenyl Phosphate)

Resorcinol bis(diphenyl phosphate) used in the present invention is a kind of phosphorus-based flame retardant. Resorcinol bis(diphenyl phosphate) has a lower molecular weight, a lower viscosity and a higher phosphorus (P) content than bisphenol A bis(diphenyl phosphate) (BDP). Due to these characteristics, good flame retardancy can be imparted and high flowability can be ensured despite the use of a small amount of resorcinol bis(diphenyl phosphate).

In comparison with the addition of BDP, the addition of resorcinol bis(diphenyl phosphate) can bring about a reduction in Vicat softening temperature by about 10 to about 20° C., leading to a low processing temperature. The low processing temperature can enable the manufacture of a high quality product even in a complex mold and can suppress side effects, such as mold precipitation, arising during processing at high temperatures for a long time.

The composition may include resorcinol bis(diphenyl phosphate) in an amount of about 7 to about 30 parts by weight, for example about 10 to about 20 parts by weight, based on about 100 parts by weight of the base resin including the polycarbonate resin (a) and the impact modifier (b). In some embodiments, the composition may include the resorcinol bis(diphenyl phosphate) in an amount of about 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of resorcinol bis(diphenyl phosphate) can be in a range from about any of the foregoing amounts to about any other of the foregoing amounts.

When the composition includes the resorcinol bis(diphenyl phosphate) in an amount within this range, appropriate flow characteristics and flame retardancy can be ensured.

The flame retardant thermoplastic resin composition of the present invention may optionally further include one or more additives depending on intended use. Non-limiting examples of such additives include antioxidants, nucleating agents, surfactants, coupling agents, fillers, plasticizers, lubricants, antibacterial agents, release agents, heat stabilizers, light stabilizers, compatibilizers, inorganic additives, colorants, stabilizers, lubricating agents, antistatic agents, pigments, dyes, and flame-proofing agents. These additives may be used alone or as a mixture thereof.

The flame retardant thermoplastic resin composition of the present invention can be prepared in the form of a molded article by known methods. For example, the constituent components and optionally other additives can be simultaneously mixed, melt-extruded in an extruder, and pelletized. The pellets may be molded into a plastic molded article by injection molding or extrusion molding. Examples of suitable molding techniques include, but are not particularly limited to, extrusion molding, injection molding, calendaring, and vacuum molding.

The flame retardant thermoplastic resin composition of the present invention can have excellent flame retardancy, mold formability, impact strength and gloss characteristics. Due to these advantages, the flame retardant thermoplastic resin composition of the present invention can be used in applications where such physical properties are simultaneously required. For example, the flame retardant thermoplastic resin composition of the present invention may be used in the manufacture of automobile parts, exterior materials, and housings of electrical/electronic products, such as televisions, washing machines, cassette players, MP3 players, digital multimedia broadcasting (DMB) devices, navigation devices, mobile phones, telephones, game devices, audio players, monitors, computers, printers and photocopiers.

Next, the present invention will be better appreciated from the following examples and comparative examples. It should be understood that these examples are provided for illustration only and are not to be construed in any way as limiting the scope of the present invention.

Descriptions of details apparent to those skilled in the art will be omitted.

EXAMPLES

Detailed specifications of components used in Examples and Comparative Examples are as follows:

(a) Polycarbonate Resins (Manufactured by Cheil Industries Inc.)

① PC-1: Melt index (MI)=62 g/10 min (300° C., 1.2 kg, ISO 1133)

② PC-2: Melt index (MI)=85 g/10 min (300° C., 1.2 kg, ISO 1133)°

③ PC-3: Melt index (MI)=8 g/10 min (300° C., 1.2 kg, ISO 1133)

(b) Impact Modifiers

① g-ABS-1 (Manufactured by Cheil Industries Inc.): A graft polymer containing 45% of a rubbery polymer having an average particle diameter of 0.301 μm and a styrene monomer/acrylonitrile (content ratio=71/29). The graft polymer has a weight average molecular weight of 90,000 g/mol.

② g-ABS-2 (Manufactured by Cheil Industries Inc.): A graft polymer containing 65% of a rubbery polymer having an average particle diameter of 0.25 μm and styrene monomer/acrylonitrile (content ratio=71/29). The graft polymer has a weight average molecular weight of 80,000 g/mol.

③ MBS (Manufactured by R&H): A graft polymer containing 60% of a rubbery polymer having an average particle diameter of 100 nm. The graft polymer has a weight average molecular weight of 120,000 g/mol.

(c) Resorcinol bis(diphenyl phosphate) manufactured by Daihachi is used.

(c') Bisphenol A bis(diphenyl phosphate) (BDP) manufactured by Daihachi is used.

Examples 1-4 and Comparative Examples 1-4

The components are mixed in the amounts shown in Table 1, and then 0.3 parts by weight of Teflon 7AJ (DuPont), 0.3 parts by weight of an antioxidant (Irganox1076) and 0.2 parts by weight of a lubricant (Luwax E) with respect to 100 parts by weight of the base resin ((a)+(b)) are added thereto to prepare thermoplastic resin compositions. Each of the thermoplastic resin compositions is extruded in a 45Φ twin screw type extruder at 240° C. to produce pellets. BDP and resorcinol bis(diphenyl phosphate) are side fed. After drying at 70° C. for 2 hr, the pellets are injected using a 10 oz injection molding machine to produce specimens. The injection molding is performed at a molding temperature of 180-280° C. and a die temperature of 40-80° C. The physical properties of the resin specimens are measured by the following methods. The results are shown in Table 2.

TABLE 1

| | | Example | | | | Comparative Example | | | |
|---|---|---|---|---|---|---|---|---|---|
| | | 1 | 2 | 3 | 4 | 1 | 2 | 3 | 4 |
| PC | PC-1 (wt %) | 82 | — | 82 | — | 67 | 82 | 82 | 82 |
| | PC-2 (wt %) | — | 72 | — | 72 | — | — | — | — |
| | PC-3 (wt %) | 5 | 15 | 5 | 15 | 20 | 5 | 5 | 5 |
| Impact modifier | g-ABS-1 (wt %) | 5 | 5 | 5 | 5 | 5 | 13 | 5 | 5 |
| | g-ABS-2 (wt %) | 8 | 8 | — | — | 8 | — | 8 | — |
| | MBS (wt %) | — | — | 8 | 8 | — | — | — | 8 |
| Resorcinol bis(diphenyl phosphate) (phr) | | 16 | 16 | 16 | 16 | — | 16 | — | — |
| BDP | | — | — | — | — | 16 | — | 16 | 16 |

Methods for Evaluation of Physical Properties (1) 60° gloss (%) is measured using a Gardner gloss meter according to ASTM D523.

(2) Izod impact strength (kgf cm/cm) is measured according to ASTM D256 (specimen thickness ⅛").

(3) Melt flow index (MI, g/10 min) is measured at 220° C. and 10 kg according to ISO 1133.

(4) Vicat softening temperature (VST, ° C.) is measured at a load of 5 kg according to ISO R306.

(5) Spiral flow (S/F, cm) length of a 2 mm thick specimen is measured at injection molding temperatures of 230° C. and 250° C.

(6) Flame retardancy rating of a 2.0 mm thick specimen is measured according to the UL94 VB standard.

TABLE 2

| Physical properties | Example | | | | Comparative Example | | | |
|---|---|---|---|---|---|---|---|---|
| | 1 | 2 | 3 | 4 | 1 | 2 | 3 | 4 |
| Gloss (60°) | 99.3 | 98.5 | 101.5 | 101.9 | 98.2 | 88.5 | 95.4 | 97.2 |
| IZ (⅛") | 42 | 44 | 47 | 45 | 48 | 44 | 46 | 52 |
| MI (220° C., 10 kg) | 108 | 102 | 107 | 110 | 51 | 103 | 92 | 95 |
| VST (5 kg) | 89 | 89 | 87 | 88 | 101 | 89 | 98 | 97 |
| S/F (230° C.) | 33 | 31 | 30 | 32 | 23 | 30 | 31 | 32 |
| S/F (250° C.) | 42 | 40 | 41 | 41 | 30 | 40 | 40 | 41 |
| Flame retardancy (2.0 mm) | V-0 | V-0 | V-0 | V-0 | V-0 | V-0 | V-2 (drip) | V-2 (drip) |

As can be seen from the results in Table 2, the thermoplastic resins of Examples 1-4 exhibit better gloss characteristics, flowability and flame retardancy than the thermoplastic resins of Comparative Examples 1 and 2-4. The impact strengths of the thermoplastic resins of Examples 1-4 are maintained at an appropriate level. Particularly, comparing the flow characteristics (Vicat softening temperatures (VST)) of the thermoplastic resins, the thermoplastic resins of Examples 1-4 ensure lower processing temperatures than the thermoplastic resin of Comparative Example 1 by about 20° C. Therefore, the use of the thermoplastic resins of Examples 1-4 can enable the manufacture of high quality products even in complex molds. In addition, the low processing temperatures can suppress side effects, such as mold precipitation, arising during manufacturing at high temperature for a long time. The thermoplastic resin of Comparative Example 2 using only the large rubber particle-modified vinyl graft copolymer as an impact modifier is found to have a lower gloss than the thermoplastic resin of Example 1. These results lead to the conclusion that the mixing of the large rubber particle-modified vinyl graft copolymer with the small rubber particle-modified vinyl graft copolymer can meet requirements in terms of gloss and impact strength.

The thermoplastic resins of Comparative Examples 3 and 4 using BDP as a flame retardant in place of resorcinol bis (diphenyl phosphate) are found to have lower melt flow indices, slightly lower flame retardancy ratings, higher Vicat softening temperatures, and lower glosses than the thermoplastic resins of Examples 1 and 3. The high Vicat softening temperatures of the thermoplastic resins mean that it is difficult to lower the processing temperatures of the thermoplastic resins.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A flame retardant thermoplastic resin composition comprising (a) a polycarbonate resin, (b) an impact modifier, and (c) resorcinol bis(diphenyl phosphate) wherein the impact modifier comprises (b1) a large rubber particle-modified vinyl graft copolymer wherein the rubber particle has an average particle diameter of about 0.3 μm to about 0.7 μm, and (b2) a small rubber particle-modified graft copolymer wherein the rubber particle has an average particle diameter of about 0.05 μm to about 0.27 μm.

2. The flame retardant thermoplastic resin composition according to claim 1, wherein the thermoplastic resin composition comprises about 100 parts by weight of a base resin comprising about 80 wt % to about 99 wt % of the polycarbonate resin (a) and about 1 wt % to about 20 wt % by weight of the impact modifier (b), and about 7 to about 30 parts by weight of resorcinol bis(diphenyl phosphate).

3. The flame retardant thermoplastic resin composition according to claim 1, wherein the large rubber particle-modified vinyl graft copolymer (b1) and the small rubber particle-modified graft copolymer (b2) are present in a weight ratio of about 1:1.3 to about 1:3.

4. The flame retardant thermoplastic resin composition according to claim 1, wherein the small rubber particle-modified graft copolymer (b2) includes units derived from a $C_1$-$C_8$ alkyl (meth)acrylate.

5. The flame retardant thermoplastic resin composition according to claim 1, wherein the thermoplastic resin composition has a gloss of 98 to 105 (ASTM D523, 60°), a melt flow index (ISO 1133, 220° C., 10 kg) of about 100 to about 130 g/10 min, and a flame retardancy rating (UL94, 2 mm) of V-0.

6. The flame retardant thermoplastic resin composition according to claim 1, further comprising one or more additives selected from the group consisting of antioxidants, nucleating agents, surfactants, coupling agents, fillers, plasticizers, lubricants, antibacterial agents, release agents, heat stabilizers, light stabilizers, compatibilizers, inorganic additives, colorants, stabilizers, lubricating agents, antistatic agents, pigments, dyes, and flame-proofing agents.

7. A molded article produced by molding the flame retardant thermoplastic resin composition according to claim 1.

8. The flame retardant thermoplastic resin composition according to claim 1, wherein the large rubber particle-modified vinyl graft copolymer (b1) is an acrylonitrile butadiene styrene (ABS) graft copolymer, and the small rubber particle-modified graft copolymer (b2) is an acrylonitrile butadiene styrene (ABS) graft copolymer or a methyl methacrylate-butadiene-styrene (MBS) copolymer.

9. The flame retardant thermoplastic resin composition according to claim 1, wherein the large rubber particle-modified vinyl graft copolymer (b1) includes butadiene rubber in an amount of about 40 to about 60 wt % based on the total weight of the large rubber particle-modified vinyl graft copolymer (b1).

10. The flame retardant thermoplastic resin composition according to claim 9, wherein the small rubber particle-modified vinyl graft copolymer (b2) includes butadiene rubber in an amount of about 40 to about 65 wt % based on the total weight of the large rubber particle-modified vinyl graft copolymer (b2).

* * * * *